(12) United States Patent
John Wilson et al.

(10) Patent No.: US 11,515,981 B2
(45) Date of Patent: **\*Nov. 29, 2022**

(54) TECHNIQUES AND APPARATUSES FOR PROVIDING SYSTEM INFORMATION UPDATES IN A SYSTEM USING BANDWIDTH PARTS

(71) Applicant: QUALCOMM Incorporated, San Diego, CA (US)

(72) Inventors: Makesh Pravin John Wilson, San Diego, CA (US); Heechoon Lee, San Diego, CA (US); Tao Luo, San Diego, CA (US); Peter Gaal, San Diego, CA (US); Jing Sun, San Diego, CA (US)

(73) Assignee: QUALCOMM Incorporated, San Diego, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 16/995,587

(22) Filed: Aug. 17, 2020

(65) Prior Publication Data

US 2020/0382257 A1    Dec. 3, 2020

Related U.S. Application Data

(63) Continuation of application No. 16/160,581, filed on Oct. 15, 2018, now Pat. No. 10,749,653.

(Continued)

(51) Int. Cl.
*H04L 5/00* (2006.01)
*H04W 76/27* (2018.01)
(Continued)

(52) U.S. Cl.
CPC .......... *H04L 5/0053* (2013.01); *H04W 48/10* (2013.01); *H04W 72/042* (2013.01);
(Continued)

(58) Field of Classification Search
CPC .... H04L 5/0053; H04L 5/0007; H04W 76/11; H04W 76/27; H04W 72/042; H04W 80/02; H04B 7/0413
See application file for complete search history.

(56) References Cited

U.S. PATENT DOCUMENTS 8,478,286 B1    7/2013    Fan et al.
9,872,252 B1    1/2018    Ang et al.
(Continued)

FOREIGN PATENT DOCUMENTS

| CA | 3049162 A1 * | 7/2018 | ........... H04L 1/0039 |
| CA | 3031087 A1 * | 11/2018 | .............. H04J 11/00 |

(Continued)

OTHER PUBLICATIONS

CATT: "Remaining Aspects of BWP Operation", 3GPP TSG RAN WG1 Meeting #90bis, R1-1717839, Prague, Czechia, Oct. 9-13, 2017, 4 Pages.

(Continued)

*Primary Examiner* — Kevin D Mew
(74) *Attorney, Agent, or Firm* — Harrity & Harrity, LLP

(57) ABSTRACT

Various aspects of the present disclosure generally relate to wireless communication. In some aspects, a base station may determine updated system information for a user equipment (UE), wherein the UE is associated with an initial access bandwidth part (BWP) and a configured BWP; and transmit the updated system information to the UE using at least one of unicast signaling, multicast signaling, the configured BWP, or a particular BWP that is different from the configured BWP. Numerous other aspects are provided.

28 Claims, 6 Drawing Sheets

Related U.S. Application Data

(60) Provisional application No. 62/591,475, filed on Nov. 28, 2017.

(51) Int. Cl.
| | | |
|---|---|---|
| *H04W 76/11* | (2018.01) | |
| *H04W 72/04* | (2009.01) | |
| *H04W 48/10* | (2009.01) | |
| *H04W 80/02* | (2009.01) | |
| *H04B 7/0413* | (2017.01) | |

(52) U.S. Cl.
CPC ............ *H04W 76/11* (2018.02); *H04W 76/27* (2018.02); *H04B 7/0413* (2013.01); *H04L 5/0007* (2013.01); *H04W 80/02* (2013.01)

(56) References Cited

U.S. PATENT DOCUMENTS

| | | | |
|---|---|---|---|
| 10,034,226 | B2 | 7/2018 | Qiu et al. |
| 10,616,822 | B2 | 4/2020 | Kubota et al. |
| 10,749,653 | B2 | 8/2020 | John Wilson et al. |
| 2013/0044621 | A1 | 2/2013 | Jung et al. |
| 2013/0044727 | A1* | 2/2013 | Nory ............... H04L 5/0053 370/330 |
| 2013/0322363 | A1 | 12/2013 | Chen et al. |
| 2015/0208269 | A1 | 7/2015 | Damnjanovic et al. |
| 2016/0309282 | A1 | 10/2016 | Xu et al. |
| 2017/0201964 | A1 | 7/2017 | Gupta et al. |
| 2018/0049168 | A1 | 2/2018 | Ryu et al. |
| 2018/0049203 | A1* | 2/2018 | Xue ..................... H04L 5/0035 |
| 2018/0063865 | A1 | 3/2018 | Islam et al. |
| 2018/0098361 | A1* | 4/2018 | Ji ....................... H04W 74/0866 |
| 2018/0109406 | A1 | 4/2018 | Wang et al. |
| 2018/0279289 | A1* | 9/2018 | Islam ............... H04W 72/0446 |
| 2018/0288746 | A1 | 10/2018 | Zhang et al. |
| 2018/0324789 | A1 | 11/2018 | Park et al. |
| 2019/0044689 | A1* | 2/2019 | Yiu ..................... H04W 72/042 |
| 2019/0045491 | A1* | 2/2019 | Zhang ............... H04W 72/1289 |
| 2019/0052377 | A1* | 2/2019 | Hwang ................. H04L 5/0035 |
| 2019/0053029 | A1* | 2/2019 | Agiwal ................... H04W 4/90 |
| 2019/0053235 | A1 | 2/2019 | Novlan et al. |
| 2019/0082431 | A1* | 3/2019 | Yi ........................ H04L 5/0055 |
| 2019/0090299 | A1 | 3/2019 | Ang et al. |
| 2019/0132824 | A1* | 5/2019 | Jeon ..................... H04L 5/0092 |
| 2019/0149380 | A1* | 5/2019 | Babaei ..................... H04L 5/001 370/330 |
| 2019/0159213 | A1 | 5/2019 | Baldemair et al. |
| 2019/0166529 | A1 | 5/2019 | Chen et al. |
| 2019/0208548 | A1* | 7/2019 | Shih ..................... H04W 24/10 |
| 2019/0306841 | A1* | 10/2019 | Huang ................. H04W 76/34 |
| 2019/0394776 | A1* | 12/2019 | Lee ................... H04W 72/0453 |
| 2020/0077323 | A1* | 3/2020 | Park ..................... H04L 5/1469 |
| 2020/0120680 | A1* | 4/2020 | Hwang ................. H04L 5/0044 |

FOREIGN PATENT DOCUMENTS

| | | | | |
|---|---|---|---|---|
| CN | 104885513 | A | 9/2015 | |
| CN | 105594269 | A | 5/2016 | |
| CN | 106686729 | A | 5/2017 | |
| WO | 2014071601 | A1 | 5/2014 | |
| WO | 2014163302 | A1 | 10/2014 | |
| WO | 2016130355 | | 8/2016 | |
| WO | WO-2017102037 | A1 * | 6/2017 | ......... H04L 27/2602 |
| WO | 2017150863 | A1 | 9/2017 | |

OTHER PUBLICATIONS

International Search Report and Written Opinion—PCT/US2018/057295—ISA/EPO—dated Jan. 24, 2019.

Panasonic: "Discussion on Paging Design for NR,"3GPP Draft, 3GPP TSG RAN WG1 Meeting #91, R1-1719704, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 27-Dec. 1, 2017, Nov. 17, 2017, XP051368860, 4 pages, Retrieved from the Internet: URL: http://www.3gpp.org/ftp/tsg_ran/WG1_RL1/TSGR1_91/Docs/ [retrieved on Nov. 17, 2017].

Samsung: "Si Reception in RRC Connected: Bandwidth Part Aspects", 3GPP TSG-RAN WG2 #99bis, R2-1710092, Prague, Czech Republic. Oct. 9-13, 2017, 3 Pages.

Vivo: "BWP Impact on Idle/inactive Mode," 3GPP Draft; R2-1712759_BWP Impact On Idle Inactive Mode, 3rd Generation Partnership Project (3GPP), Mobile Competence Centre; 650, Route Des Lucioles; F-06921 Sophia-Antipolis Cedex; France, vol. RAN WG2, NO. Reno, USA; Nov. 27, 2017-Dec. 1, 2017, Nov. 17, 2017, XP051371662, 2 pages, Retrieved from the Internet: URL: http://www.3gpp.org/ftp/tsg%5Fran/WG2%5FRL2/TSGR2%5F100/Docs/ [retrieved on Nov. 17, 2017].

Taiwan Search Report—TW107137746—TIPO—dated Nov. 21, 2021.

Taiwan Search Report—TW107137746—TIPO—dated Jun. 21, 2022.

* cited by examiner

TECHNIQUES AND APPARATUSES FOR PROVIDING SYSTEM INFORMATION UPDATES IN A SYSTEM USING BANDWIDTH PARTS

CROSS REFERENCE TO RELATED APPLICATION

This application claims the benefit of U.S. Non-Provisional application Ser. No. 16/160,581, entitled "TECHNIQUES AND APPARATUSES FOR PROVIDING SYSTEM INFORMATION UPDATES IN A SYSTEM USING BANDWIDTH PARTS", filed on Oct. 15, 2018, which claims benefit of U.S. Provisional Application Ser. No. 62/591,475, entitled "TECHNIQUES AND APPARATUSES FOR PROVIDING SYSTEM INFORMATION UPDATES IN A SYSTEM USING BANDWIDTH PARTS", filed on Nov. 28, 2017, the entire contents of which are expressly incorporated by reference herein in its entirety.

FIELD OF THE DISCLOSURE

Aspects of the present disclosure generally relate to wireless communication, and more particularly to techniques and apparatuses for providing system information updates in a system using bandwidth parts.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication performed by a base station may include determining updated system information for a user equipment (UE), wherein the UE is associated with an initial access bandwidth part (BWP) and a configured BWP; and transmitting the updated system information to the UE using at least one of unicast signaling, multicast signaling, the configured BWP, or a particular BWP that is different from the configured BWP.

In some aspects, a base station for wireless communication may include memory and one or more processors operatively coupled to the memory. The memory and the one or more processors may be configured to determine updated system information for a UE, wherein the UE is associated with an initial access BWP and a configured BWP; and transmit the updated system information to the UE using at least one of unicast signaling, multicast signaling, the configured BWP, or a particular BWP that is different from the configured BWP.

In some aspects, a non-transitory computer-readable medium may store one or more instructions for wireless communication. The one or more instructions, when executed by one or more processors of a base station, may cause the one or more processors to determine updated system information for a UE, wherein the UE is associated with an initial access BWP and a configured BWP; and transmit the updated system information to the UE using at least one of unicast signaling, multicast signaling, the configured BWP, or a particular BWP that is different from the configured BWP.

In some aspects, an apparatus for wireless communication may include means for determining updated system information for a UE, wherein the UE is associated with an initial access BWP and a configured BWP; and means for transmitting the updated system information to the UE using at least one of unicast signaling, multicast signaling, the configured BWP, or a particular BWP that is different from the configured BWP.

In some aspects, a method of wireless communication performed by a UE may include receiving updated system information for the UE, wherein the UE is associated with an initial access BWP and a configured BWP, and wherein the updated system information is received using at least one of unicast signaling, multicast signaling, the configured BWP, or a particular BWP that is different from the configured BWP; and processing the updated system information.

In some aspects, a UE for wireless communication may include memory and one or more processors operatively coupled to the memory. The memory and the one or more processors may be configured to receive updated system information for the UE, wherein the UE is associated with an initial access BWP and a configured BWP, and wherein the updated system information is received using at least one of unicast signaling, multicast signaling, the configured BWP, or a particular BWP that is different from the configured BWP; and process the updated system information.

In some aspects, a non-transitory computer-readable medium may store one or more instructions for wireless communication. The one or more instructions, when executed by one or more processors of a UE, may cause the one or more processors to receive updated system information for the UE, wherein the UE is associated with an initial access BWP and a configured BWP, and wherein the updated system information is received using at least one of unicast signaling, multicast signaling, the configured BWP, or a particular BWP that is different from the configured BWP; and process the updated system information.

In some aspects, an apparatus for wireless communication may include means for receiving updated system information for the apparatus, wherein the apparatus is associated with an initial access BWP and a configured BWP, and wherein the updated system information is received using at least one of unicast signaling, multicast signaling, the configured BWP, or a particular BWP that is different from the configured BWP; and means for processing the updated system information.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
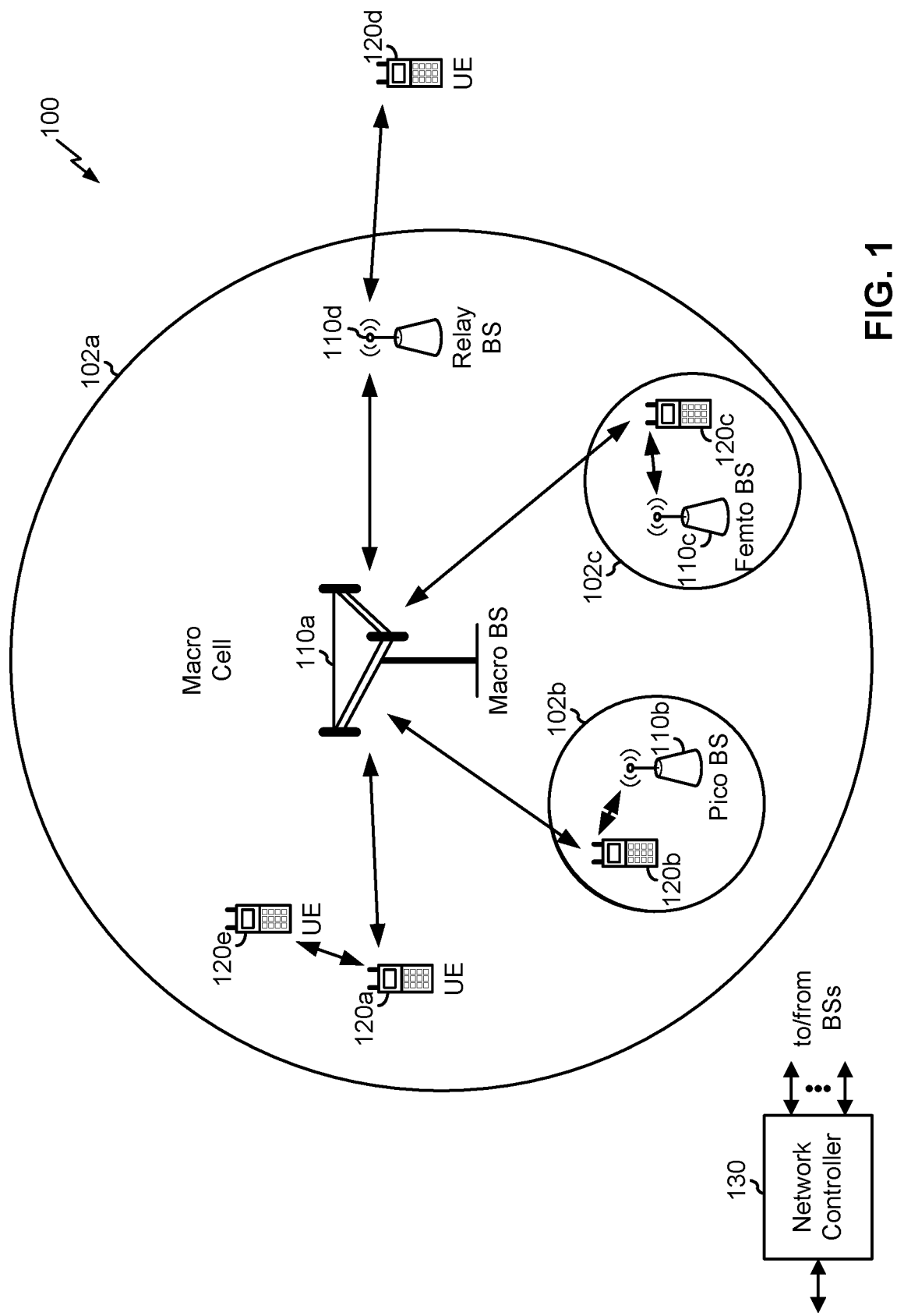
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a BS 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the BS 110.

As indicated above, FIG. 1 is provided merely as an example. Other examples are possible and may differ from what was described with regard to FIG. 1.

Figure 2:
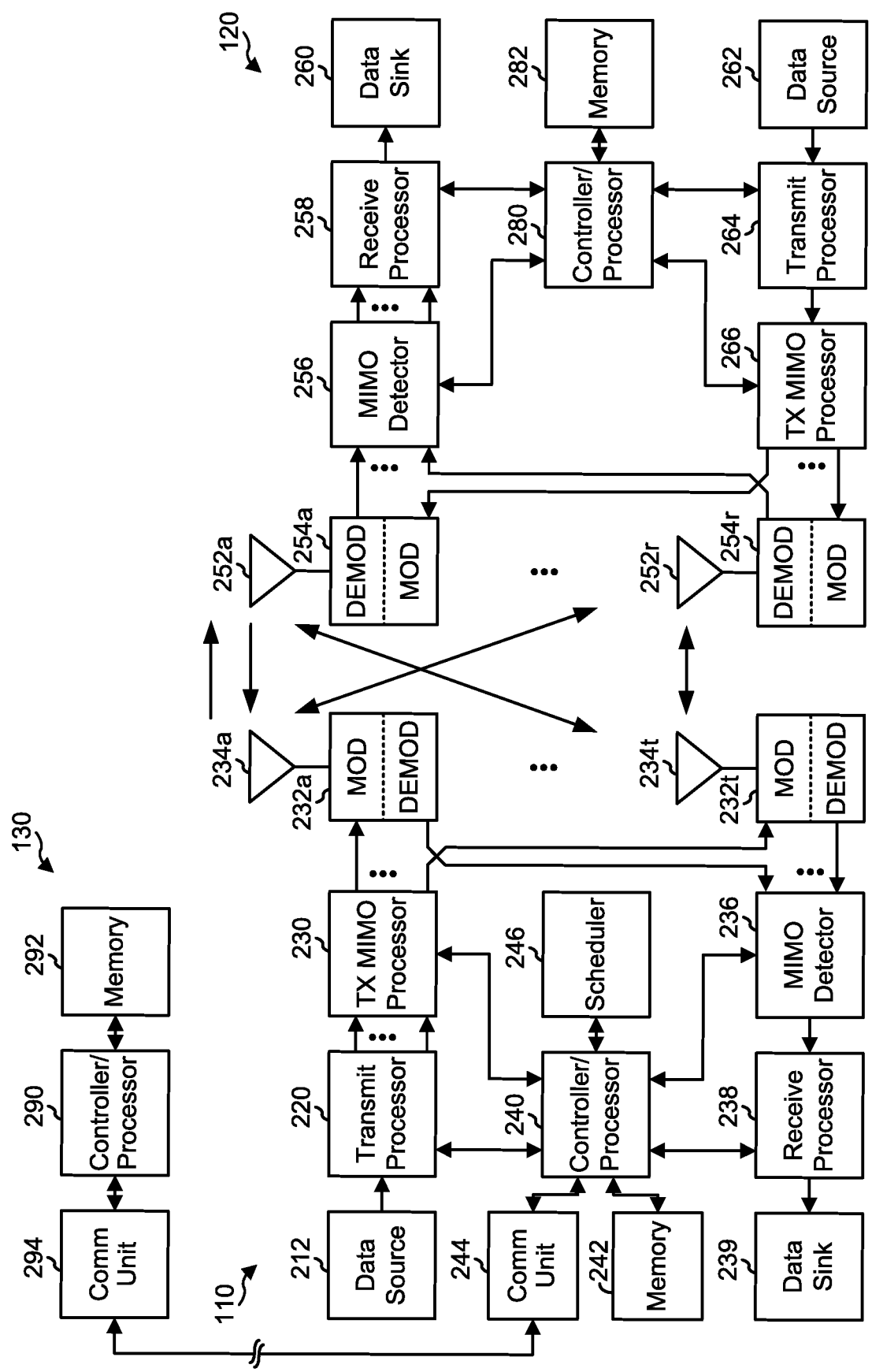
FIG. 2 is a block diagram conceptually illustrating an example of a base station in communication with a user equipment (UE) in a wireless communication network, in accordance with various aspects of the present disclosure.

FIG. 2 shows a block diagram of a design of BS 110 and UE 120, which may be one of the base stations and one of the UEs in FIG. 1. BS 110 may be equipped with T antennas 234a through 234t, and UE 120 may be equipped with R antennas 252a through 252r, where in general T≥1 and R≥1.

At BS 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s)

selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from BS 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to BS 110. At BS 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of BS 110, controller/processor 280 of UE 120, and/or any other component(s) of FIG. 2 may perform one or more techniques associated with providing updated system information in a system with multiple bandwidth parts, as described in more detail elsewhere herein. For example, controller/processor 240 of BS 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for BS 110 and UE 120, respectively. A scheduler 246 may schedule UEs for data transmission on the downlink and/or uplink.

In some aspects, UE 120 may include means for receiving updated system information for the UE 120, means for processing the updated system information, means for switching to or monitoring a particular BWP based at least in part on a received message, and/or the like. In some aspects, such means may include one or more components of UE 120 described in connection with FIG. 2.

In some aspects, BS 110 may include means for determining updated system information for a UE 120, means for transmitting the updated system information to the UE 120 using at least one of unicast signaling to the UE 120, multicast signaling to the UE 120, the configured BWP, or a particular BWP that is different from the configured BWP, means for transmitting a message to configure the UE to switch to or monitor the particular BWP, and/or the like. In some aspects, such means may include one or more components of BS 110 described in connection with FIG. 2.

As indicated above, FIG. 2 is provided merely as an example. Other examples are possible and may differ from what was described with regard to FIG. 2.

Figure 3:
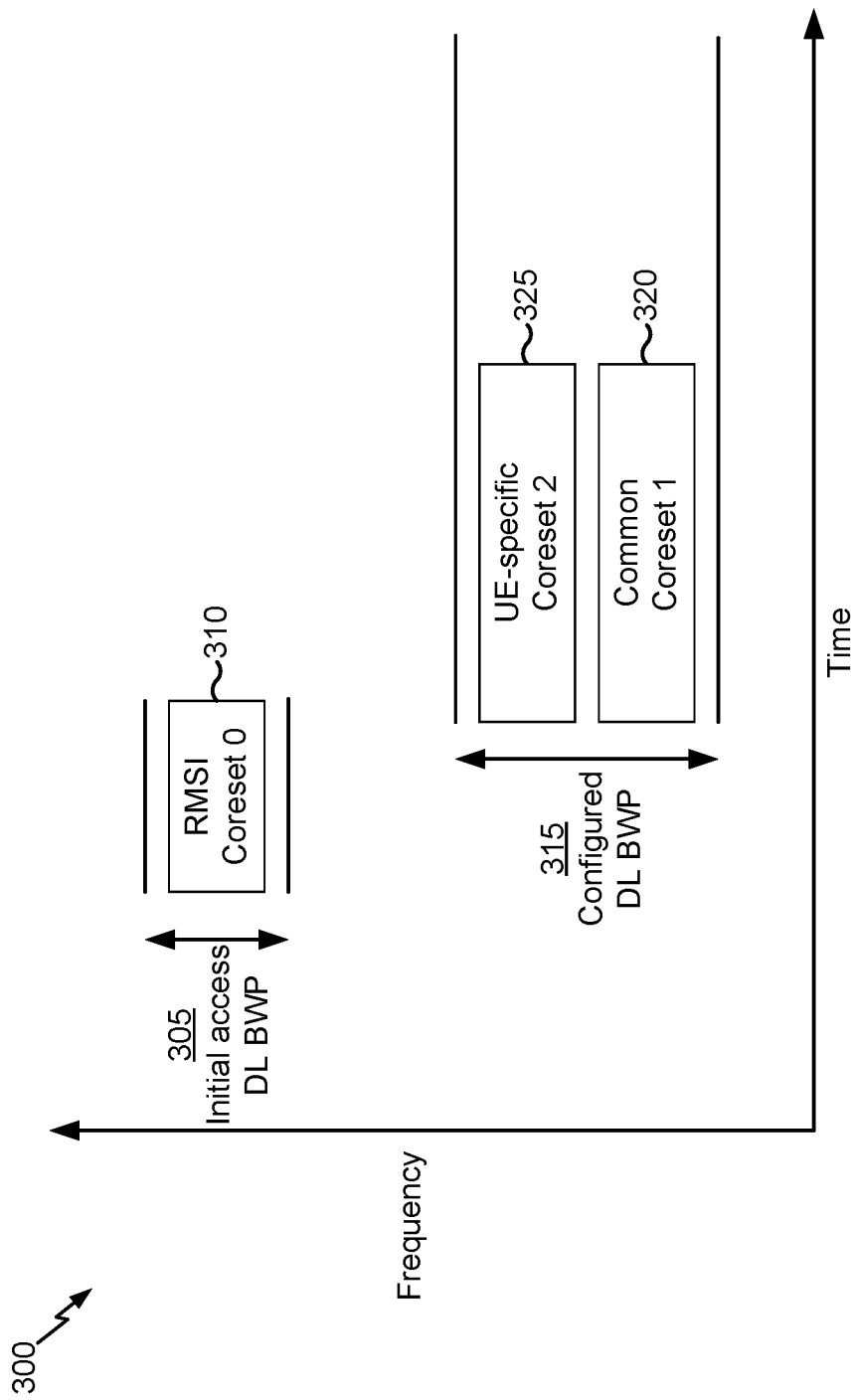
FIG. 3 is a diagram illustrating an example of an initial access bandwidth part and a configured bandwidth part, in accordance with various aspects of the present disclosure.

FIG. 3 is a diagram illustrating an example 300 of an initial access bandwidth part and a configured bandwidth part, in accordance with various aspects of the present disclosure. FIG. 3 shows an example wherein a UE (e.g., UE 120) performs initial access using a first BWP, and is configured to use a second BWP for communications after initial access is performed. As used herein, a bandwidth part refers to a configured frequency range in which a UE is to communicate. For example, a UE may not be required to receive a downlink signal outside of a bandwidth part of the UE.

As shown in FIG. 3, and by reference number 305, a UE may perform initial access using an initial access BWP, which is shown in FIG. 3 as an initial access downlink (DL) BWP. As shown by reference number 310, the UE may receive remaining minimum system information (RMSI) in the initial access BWP. For example, the UE may receive the RMSI in a particular control resource set (coreset) of the initial access BWP (e.g., coreset 0), such as a physical broadcast channel (PBCH) of the initial access BWP. In some aspects, a width of the initial access BWP may be based at least in part on a bandwidth of the particular coreset. For example, the width of the initial access BWP may be equal to the bandwidth of the particular coreset (e.g., the RMSI coreset).

As shown by reference number 315, the UE may be associated with a configured BWP, shown in FIG. 3 as a configured DL BWP. For example, a scheduling entity (e.g., BS 110 or UE 120) may configure UE to communicate using the configured BWP and/or to monitor the configured BWP. In some aspects, the configured BWP may be configured based at least in part on radio resource control (RRC)

signaling, media access control (MAC) signaling such as a MAC control element (CE), downlink control information (DCI), a master information block (MIB), a RMSI, and/or the like.

As shown, in some aspects, the configured BWP may be associated with a different bandwidth and/or a different frequency than the initial access BWP. In this way, a different frequency and/or bandwidth may be used for initial access than for communication, which improves spectral efficiency, provides time and/or frequency diversity, and increases throughput of the UE.

As shown by reference number 320, in some aspects, the configured BWP may be associated with one or more common coresets, which may be included in a common search space that is searched by all UEs associated with the configured BWP. For example, a search space may include control information for a UE that is masked in a particular candidate sample of the search space, and the UE may search candidate samples of the search space until the UE identifies the particular candidate sample corresponding to the UE. The UE may decode the particular candidate sample to determine the control information. As shown by reference number 325, in some aspects, the configured BWP may be associated with a UE-specific coreset or search space (e.g., coreset 2), which may include a coreset or search space that is searched by a specific UE.

As shown, the configured BWP is offset from the initial access BWP in the frequency domain, indicating that the configured BWP may be associated with a different frequency than the initial access BWP. As further shown, the configured BWP may be offset from the initial access BWP in the time domain, indicating that initial access may be performed using the initial access BWP before the configured BWP is configured. For example, the UE may tune from the initial access BWP to the configured BWP.

As indicated above, FIG. 3 is provided as an example. Other examples are possible and may differ from what was described with respect to FIG. 3.

A UE may communicate with a BS using one or more bandwidth parts. During initial access, the UE may communicate using an initial access BWP, as described in connection with FIG. 3, above. For example, the UE may receive system information, such as RMSI, using the initial access BWP. After initial access, the UE may communicate using a configured BWP, as is also described in more detail in connection with FIG. 3, above.

In some cases, system information may be updated. For example, a BS may determine updated system information based at least in part on a change to a configuration of the BS or based at least in part on a system update. Additionally, or alternatively, an identifier of the UE (e.g., a radio network temporary identifier) or the like may change. In such a case, the BS may need to provide the updated system information to the UE. However, the UE may already have tuned from the initial access BWP to the configured BWP, which may make it difficult to provide the updated system information via the initial access BWP.

Techniques and apparatuses described herein may provide updated system information to a UE that is associated with an initial access BWP and a configured BWP. For example, the BS may provide the updated system information via the configured BWP, using a unicast or multicast message, or via a particular BWP other than the configured BWP (e.g., the initial access BWP or another BWP that is different than the initial access BWP and the configured BWP). In this way, updated system information is provided to a UE associated with an initial access BWP and a configured BWP, which improves performance of the network and increases efficiency of providing the updated system information in comparison to performing another initial access procedure for the UE.

Figure 4:
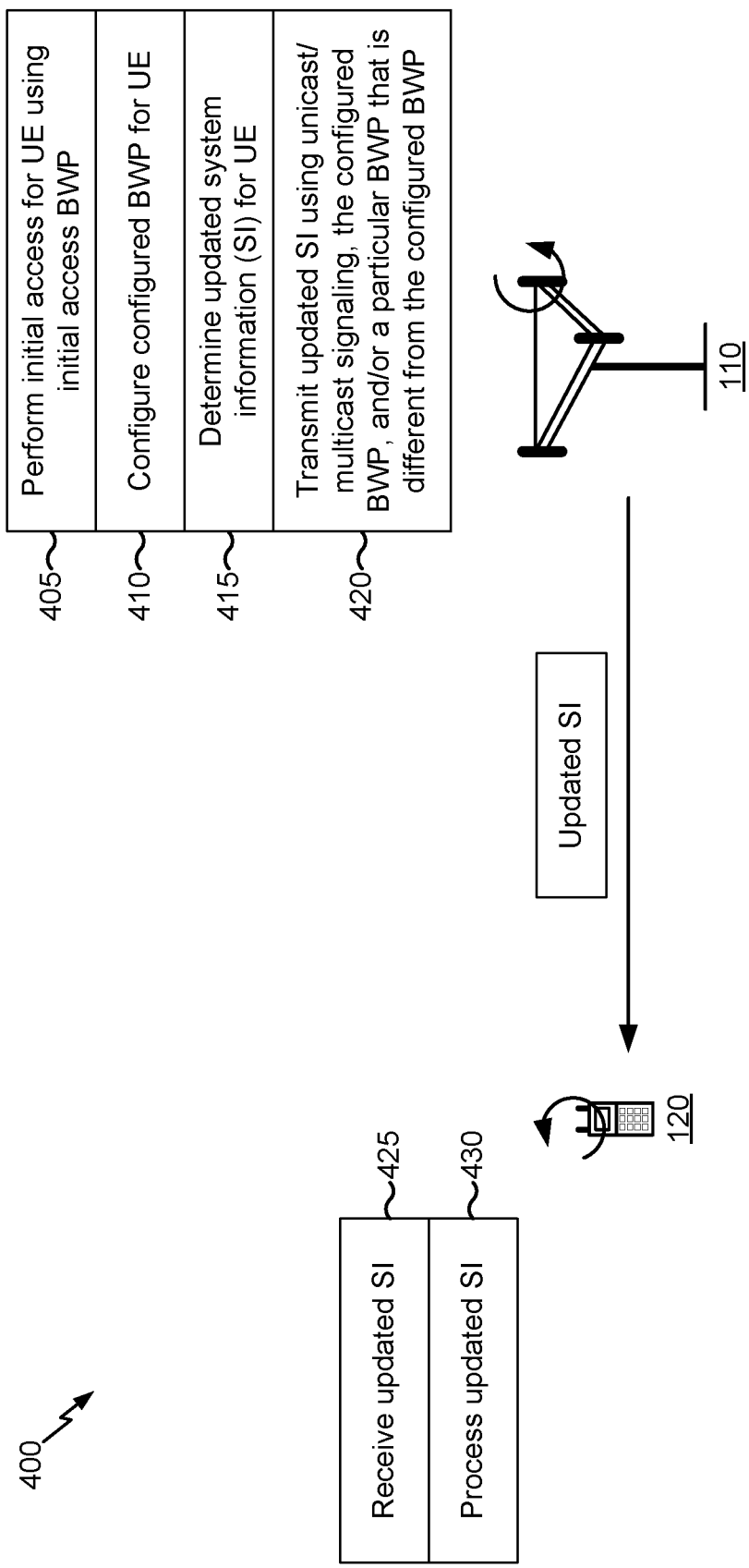
FIG. 4 is a diagram illustrating an example of providing updated system information in a system with multiple bandwidth parts, in accordance with various aspects of the present disclosure.

FIG. 4 is a diagram illustrating an example 400 of providing updated system information in a system with multiple bandwidth parts, in accordance with various aspects of the present disclosure. As shown, example 400 includes a BS 110 and a UE 120. For example, the BS 110 may provide an initial access BWP for the UE 120, such as the initial access BWP described in connection with FIG. 3, above.

As shown in FIG. 4, and by reference number 405, the BS 110 may perform initial access for the UE 120 using the initial access BWP. For example, the BS 110 may broadcast system information (e.g., RMSI and/or the like) in the initial access BWP. UEs performing initial access (e.g., UE 120) may scan the initial access BWP to determine the system information, and may communicate with the BS 110, based at least in part on the system information, to perform initial access.

As shown by reference number 410, the BS 110 may configure a configured BWP for the UE 120. For example, the configured BWP may have a different center frequency and/or bandwidth than the initial access BWP. In such a case, the UE 120 may tune from the initial access BWP to the configured BWP. The BS 110 may use the configured BWP to transmit control information and/or downlink communications to the UE 120. By providing the configured BWP separately from the initial access BWP, interference is reduced, spectral efficiency is improved, and time and/or frequency diversity is achieved.

As shown by reference number 415, the BS 110 may determine updated system information (shown as SI) for the UE 120. For example, the BS 110 may determine updated system information that is relevant to the UE 120 and/or a group of UEs that includes the UE 120. In some aspects, the BS 110 may determine updated system information for the BS 110, such as a system update and/or the like.

As shown by reference number 420, the BS 110 may transmit the updated system information to the UE 120. For example, the BS 110 may transmit the updated system information using unicast signaling, multicast signaling, the configured BWP, and/or a particular BWP that is different from the configured BWP. Each of these techniques is described in turn below.

In some aspects, the BS 110 may transmit the updated system information using unicast signaling to the UE 120. For example, the updated system information may be signaled to the UE 120 in a UE-specific manner (e.g. based at least in part on an identifier of the UE 120, such as a radio network temporary identifier (RNTI), a network address, and/or the like). In such a case, the unicast signaling or unicast signal may include DCI, a MAC CE, RRC signaling, and/or the like. For example, the BS 110 may provide unicast RRC signaling to the UE 120 identifying the updated system information, which may conserve network resources that would otherwise be used to multicast or broadcast the updated system information.

In some aspects, the BS 110 may transmit the updated system information using multicast signaling to the UE 120. For example, the BS 110 may transmit a multicast signal to a group of UEs that includes the UE 120. In such a case, the multicast signal may include DCI, a MAC CE, RRC signaling, and/or the like. In some aspects, the BS 110 may transmit the multicast signal to a group of UEs 120 using group DCI based at least in part on a group RNTI that is used for multicast signaling of the group of UEs 120. This may conserve resources of the BS 110 that may otherwise be used to unicast updated system information to each UE 120 of the group of UEs 120.

In some aspects, the BS 110 may transmit the updated system information using the configured BWP. For example, the BS 110 may repeat the updated system information in the configured BWP. In such a case, the BS 110 may repeat the updated system information in the configured BWP with a same periodicity as in the initial access BWP (e.g., every 20 ms, every 80 ms, every 160 ms, or with another periodicity). In some aspects, the BS 110 may repeat the updated system information in the configured BWP with a different periodicity than in the initial access BWP. Additionally, or alternatively, the BS 110 may repeat the updated system information during a particular time window, such as a configured time window. For example, the BS 110 may repeat the updated system information within a time window (for example, 500 ms, 1000 ms, or another length of time).

In some aspects, the BS 110 may transmit the updated system information using a particular BWP that is different than the configured BWP. For example, the BS 110 may transmit a message to cause the UE 120 to switch to the particular BWP to receive the updated system information. Additionally, or alternatively, the BS 110 may transmit a message to cause the UE 120 to monitor the particular BWP for the updated system information. In such a case, the BS 110 may transmit the message to cause the UE 120 to monitor the particular BWP for a particular length of time, then to switch to or monitor the configured BWP. For example, the UE 120 may switch to or monitor the particular BWP, then may switch back to the configured BWP. The message may include DCI, an RRC message, a MAC CE, and/or the like.

In some aspects, the particular BWP may be the initial access BWP, which may reduce complexity of transmission of the updated system information and/or eliminate a need for retransmission of the updated system information in multiple, different bandwidth parts. In some aspects, the particular BWP may be different than the initial access BWP and the configured BWP. For example, a frequency center of the particular BWP may be nearer to the configured BWP than to the initial access BWP, which may reduce an amount of time needed for the UE 120 to tune to the particular BWP and back to the configured BWP.

In some aspects, the message to configure the UE 120 to switch to or monitor the particular BWP may include a paging message. For example, a paging message may indicate that the updated system information is available. In such a case, the paging message may further identify the particular BWP and/or indicate that the UE 120 is to switch to (e.g., tune to, monitor) the particular BWP. The UE 120 may switch to (e.g., tune to, monitor) the particular BWP to determine the updated system information. In this way, updated system information is provided to the UE 120 using the particular BWP, which conserves resources of the configured BWP.

As shown by reference number 425, the UE 120 may receive the updated system information. For example, the UE 120 may receive the updated system information as a unicast or multicast signal. In some aspects, the UE 120 may receive the updated system information in the configured BWP (e.g., when the updated system information is repeated in the configured BWP). In some aspects, the UE 120 may receive the updated system information in the particular BWP (e.g., when the BS 110 transmits a message to configure the UE 120 to receive the updated system information in the particular BWP).

As shown by reference number 430, the UE 120 may process the updated system information. For example, the UE 120 may reconfigure to implement the updated system information. In some aspects, the UE 120 may communicate with the BS 110 based at least in part on the updated system information. In this way, the UE 120 is provided with the updated system information after the UE 120 has tuned to the configured BWP from the initial access BWP. Thus, performance of UEs associated with initial access BWPs and configured BWPs is improved and provision of updated system information to such UEs is enabled.

As indicated above, FIG. 4 is provided as an example. Other examples are possible and may differ from what was described with respect to FIG. 4.

Figure 5:
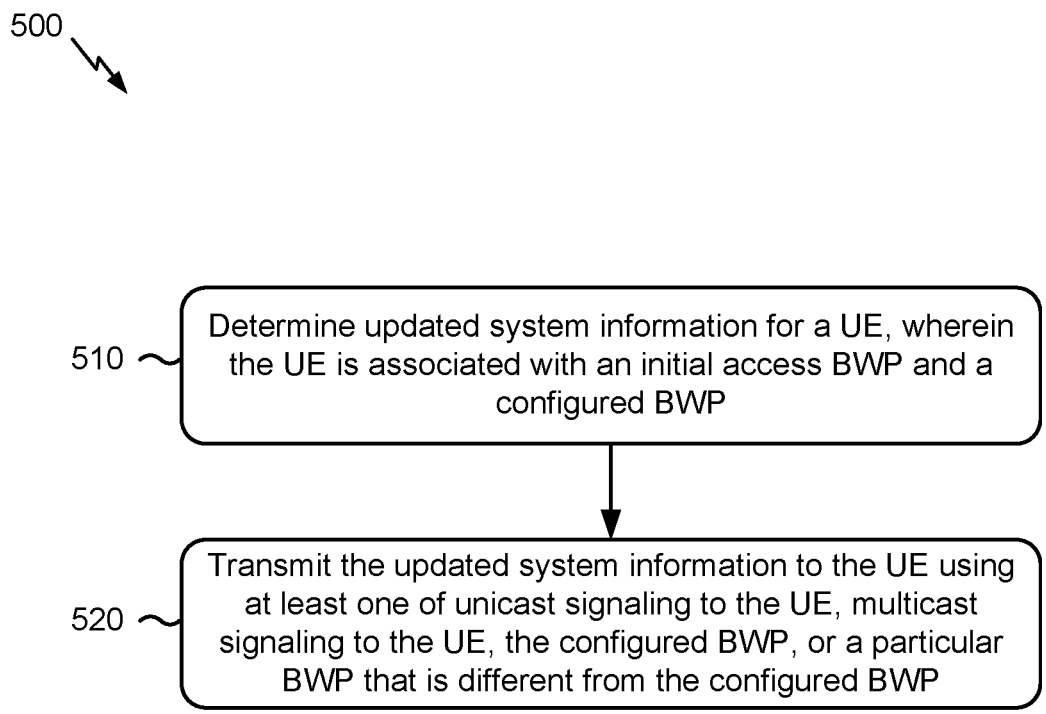
FIG. 5 is a diagram illustrating an example process performed, for example, by a base station, in accordance with various aspects of the present disclosure.

FIG. 5 is a diagram illustrating an example process 500 performed, for example, by a base station, in accordance with various aspects of the present disclosure. Example process 500 is an example where a base station (e.g., BS 110) provides updated system information for a UE associated with multiple bandwidth parts.

As shown in FIG. 5, in some aspects, process 500 may include determining updated system information for a UE, wherein the UE is associated with an initial access BWP and a configured BWP (block 510). For example, the base station (e.g., using controller/processor 240 and/or the like) may determine updated system information for a UE. The UE may be associated with an initial access BWP, which may be used to perform initial access for the UE. The UE may also be associated with a configured BWP, to which the UE may tune or switch after initial access is performed.

As shown in FIG. 5, in some aspects, process 500 may include transmitting the updated system information to the UE using at least one of unicast signaling, multicast signaling, the configured BWP, or a particular BWP that is different from the configured BWP (block 520). For example, the base station (e.g., using controller/processor 240, transmit processor 220, TX MIMO processor 230, MOD 232, antenna 234, and/or the like) may transmit the updated system information to the UE. In some aspects, the base station may transmit the updated system information using unicast signaling. In some aspects, the base station may transmit the updated system information using multicast signaling. In some aspects, the base station may transmit the updated system information using the configured BWP. In some aspects, the base station may transmit the updated system information using a particular BWP which may be different from the configured BWP.

Process 500 may include additional aspects, such as any single aspect or any combination of aspects described below and/or in connection with one or more other processes described elsewhere herein.

In some aspects, the unicast signaling uses at least one of downlink control information, a media access control (MAC) control element (CE), or radio resource control (RRC) signaling. In some aspects, the multicast signaling uses at least one of downlink control information, a media access control (MAC) control element (CE), or radio resource control (RRC) signaling. In some aspects, the multicast signaling uses a group downlink control information associated with a particular group radio network temporary identifier (RNTI).

In some aspects, the base station may transmit a message to configure the UE to switch to or monitor the particular BWP, wherein the particular BWP carries the updated system information. In some aspects, the message is used to configure the UE to switch to or monitor the particular BWP for a particular length of time, and wherein the message is used to configure the UE to switch back to the configured BWP after the particular length of time. In some aspects, the message is a paging message.

In some aspects, the particular BWP is the initial access BWP. In some aspects, the updated system information is repeated in the configured BWP using a same periodicity as system information that is transmitted in the initial access BWP. In some aspects, the updated system information is repeated in the configured BWP in a particular time window.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
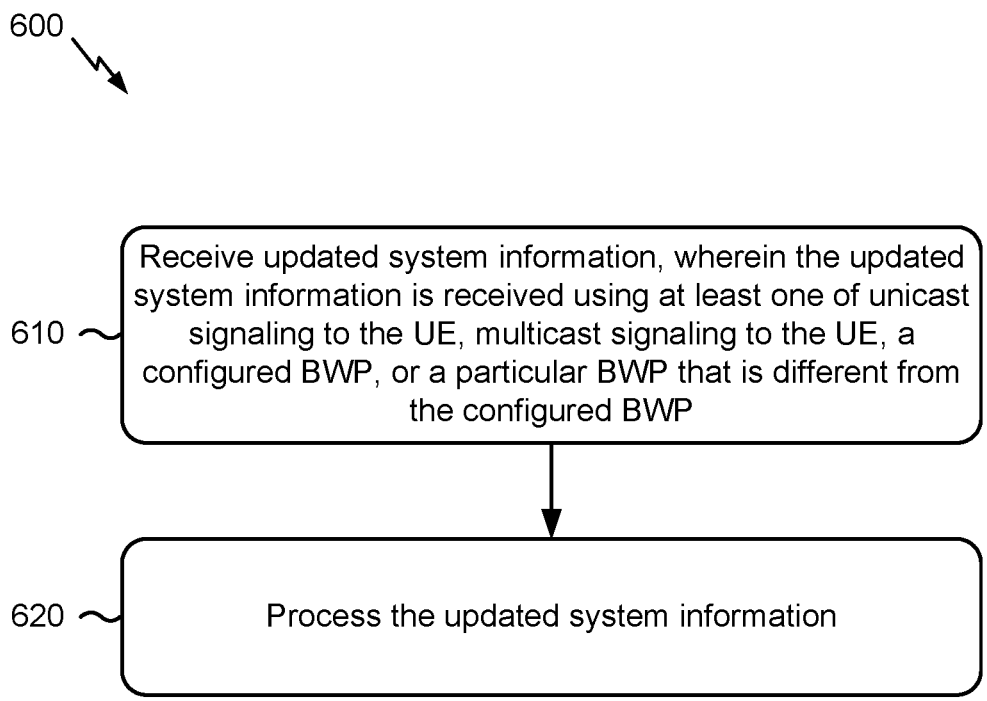
FIG. 6 is a diagram illustrating an example process performed, for example, by a UE, in accordance with various aspects of the present disclosure.

FIG. 6 is a diagram illustrating an example process 600 performed, for example, by a UE, in accordance with various aspects of the present disclosure. Example process 600 is an example where a UE (e.g., UE 120) receives updated system information for a UE associated with multiple bandwidth parts.

As shown in FIG. 6, in some aspects, process 600 may include receiving updated system information, wherein the updated system information is received using at least one of unicast signaling, multicast signaling, a configured BWP, or a particular BWP that is different from the configured BWP (block 610). For example, the UE (e.g., using antenna 252, DEMOD 254, MIMO detector 256, receive processor 258, controller/processor 280, and/or the like) may receive updated system information. The UE may be associated with an initial access BWP and a configured BWP. In some aspects, the UE may monitor for the updated system information (e.g., in a particular coreset or search space). In some aspects, the UE may receive the updated system information as unicast signaling. In some aspects, the UE may receive the updated system information as multicast signaling. In some aspects, the UE may receive the updated system information using the configured BWP. In some aspects, the UE may receive the updated system information using a particular BWP that may be different from the configured BWP.

As shown in FIG. 6, in some aspects, process 600 may include processing the updated system information (block 620). For example, the UE (e.g., using controller/processor 280 and/or the like) may process the updated system information. In some aspects, the UE may decode the updated system information. For example, the UE may descramble and decode the updated system information using a RNTI of the UE. In some aspects, the UE may perform a communication based at least in part on the updated system information. In some aspects, the UE may perform cell reselection based at least in part on the updated system information.

Process 600 may include additional aspects, such as any single aspect or any combination of aspects described below and/or in connection with one or more other processes described elsewhere herein.

In some aspects, the unicast signaling includes at least one of downlink control information, a media access control (MAC) control element (CE), or radio resource control (RRC) signaling. In some aspects, the multicast signaling uses at least one of downlink control information, a media access control (MAC) control element (CE), or radio resource control (RRC) signaling. In some aspects, the multicast signaling uses a group downlink control information associated with a particular group radio network temporary identifier (RNTI). In some aspects, the UE may switch to or monitor the particular BWP based at least in part on a received message, wherein the particular BWP carries the updated system information. In some aspects, the UE is configured to switch to or monitor the particular BWP for a particular length of time, and wherein the UE is configured to switch back to the configured BWP after the particular length of time. In some aspects, the received message is a paging message. In some aspects, the particular BWP is the initial access BWP. In some aspects, the updated system information is repeated in the configured BWP using a same periodicity as system information that is transmitted in the initial access BWP. In some aspects, the updated system information is repeated in the configured BWP in a particular time window.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a network entity, comprising:
   determining updated system information for a user equipment (UE),
      wherein the UE is associated with an initial access bandwidth part (BWP) and a configured BWP; and
   transmitting the updated system information to the UE using at least one of the configured BWP or a particular BWP that is different from the initial access BWP.

2. The method of claim 1,
   wherein the updated system information is transmitted further using unicast signaling, and
   wherein the unicast signaling uses at least one of downlink control information, a media access control (MAC) control element (CE), or radio resource control (RRC) signaling.

3. The method of claim 1,
   wherein the updated system information is transmitted further using multicast signaling, and
   wherein the multicast signaling uses at least one of downlink control information, a media access control (MAC) control element (CE), or radio resource control (RRC) signaling.

4. The method of claim 1,
   wherein the updated system information is transmitted further using multicast signaling, and
   wherein the multicast signaling uses a group downlink control information associated with a particular group radio network temporary identifier (RNTI).

5. The method of claim 1, further comprising:
   transmitting a message to configure the UE to switch to or monitor the particular BWP,
      wherein the updated system information is transmitted using at least the particular BWP.

6. The method of claim 5, wherein the message is used to configure the UE to switch to or monitor the particular BWP for a particular length of time, and wherein the message is used to configure the UE to switch back to the configured BWP after the particular length of time.

7. The method of claim 5, wherein the message is a paging message.

8. The method of claim 1, wherein the updated system information is repeated in the configured BWP using a same periodicity as system information that is transmitted in the initial access BWP.

9. The method of claim 1, wherein the updated system information is repeated in the configured BWP in a particular time window.

10. A network entity for wireless communication, comprising:
    a memory; and
    one or more processors operatively coupled to the memory, the one or more processors configured to:
       determine updated system information for a user equipment (UE),
          wherein the UE is associated with an initial access bandwidth part (BWP) and a configured BWP; and
       transmit the updated system information to the UE using at least one of the configured BWP or a particular BWP that is different from the initial access BWP.

11. The network entity of claim 10,
    wherein the updated system information is transmitted further using unicast signaling, and
    wherein the unicast signaling uses at least one of downlink control information, a media access control (MAC) control element (CE), or radio resource control (RRC) signaling.

12. The network entity of claim 10,
    wherein the updated system information is transmitted further using multicast signaling, and wherein the multicast signaling uses at least one of downlink control information, a media access control (MAC) control element (CE), or radio resource control (RRC) signaling.

13. The network entity of claim 10,
    wherein the updated system information is transmitted further using multicast signaling, and wherein the multicast signaling uses a group downlink control information associated with a particular group radio network temporary identifier (RNTI).

14. The network entity of claim 10,
    wherein the one or more processors are further configured to:
       transmit a message to configure the UE to switch to or monitor the particular BWP, and
    wherein the updated system information is transmitted using at least the particular BWP.

15. The network entity of claim 14, wherein the message is used to configure the UE to switch to or monitor the particular BWP for a particular length of time, and
    wherein the message is used to configure the UE to switch back to the configured BWP after the particular length of time.

16. The network entity of claim 14, wherein the message is a paging message.

17. The network entity of claim 10, wherein the updated system information is repeated in the configured BWP using a same periodicity as system information that is transmitted in the initial access BWP.

18. The network entity of claim 10, wherein the updated system information is repeated in the configured BWP in a particular time window.

19. A method of wireless communication performed by a user equipment (UE), comprising:
    receiving updated system information for the UE,
       wherein the UE is associated with an initial access bandwidth part (BWP) and a configured BWP, and
       wherein the updated system information is received using at least one of the configured BWP or a particular BWP that is different from the initial access BWP; and
    processing the updated system information.

20. The method of claim 19,
    wherein the updated system information is received further using unicast signaling, and wherein the unicast signaling includes at least one of downlink control information, a media access control (MAC) control element (CE), or radio resource control (RRC) signaling.

21. The method of claim 19, further comprising:
switching to or monitoring the particular BWP based at least in part on a received message,
wherein the updated system information is received using at least the particular BWP.

22. A user equipment (UE) for wireless communication, comprising:
a memory; and
one or more processors operatively coupled to the memory, the one or more processors configured to:
receive updated system information for the UE,
wherein the UE is associated with an initial access bandwidth part (BWP) and a configured BWP, and
wherein the updated system information is received using at least the configured BWP or a particular BWP that is different from the initial access BWP; and
process the updated system information.

23. The UE of claim 22,
wherein the updated system information is received further using unicast signaling, and
wherein the unicast signaling includes at least one of downlink control information, a media access control (MAC) control element (CE), or radio resource control (RRC) signaling.

24. The UE of claim 22,
wherein the one or more processors are configured to:
switch to or monitor the particular BWP based at least in part on a received message, and
wherein the updated system information is received using at least the particular BWP.

25. The UE of claim 22, wherein the updated system information is received using at least the configured BWP.

26. The UE of claim 22, wherein the updated system information is received using at least the particular BWP.

27. The network entity of claim 10, wherein the updated system information is transmitted using at least the configured BWP.

28. The network entity of claim 10, wherein the updated system information is received using at least the particular BWP.

* * * * *